US012585997B2

(12) United States Patent
Naono et al.

(10) Patent No.: US 12,585,997 B2
(45) Date of Patent: Mar. 24, 2026

(54) DATA MODEL CONFIGURATION METHOD FOR LEARNING DATA, LEARNING DATA GENERATION APPARATUS, AND MACHINE LEARNING METHOD

(71) Applicant: Hitachi, Ltd., Tokyo (JP)

(72) Inventors: Ken Naono, Tokyo (JP); Mika Takata, Tokyo (JP); Hiroaki Masuda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 759 days.

(21) Appl. No.: 17/973,670

(22) Filed: Oct. 26, 2022

(65) Prior Publication Data

US 2023/0162086 A1 May 25, 2023

(30) Foreign Application Priority Data

Nov. 22, 2021 (JP) .................................. 2021-189669

(51) Int. Cl.
*G06N 20/00* (2019.01)
*G06F 16/25* (2019.01)

(52) U.S. Cl.
CPC ........... *G06N 20/00* (2019.01); *G06F 16/258* (2019.01)

(58) Field of Classification Search
None
See application file for complete search history.

(56) References Cited

U.S. PATENT DOCUMENTS

| | | | | |
|---|---|---|---|---|
| 11,741,069 B2 * | 8/2023 | Amzal | ................... | G06N 20/00 707/737 |
| 2008/0031233 A1 * | 2/2008 | Ito | ......................... | H04L 63/101 370/355 |
| 2018/0247207 A1 * | 8/2018 | Ristovski | ............... | G06N 20/20 |
| 2020/0387664 A1 | 12/2020 | Kusumura et al. | | |
| 2020/0401877 A1 * | 12/2020 | Alda | ........................ | G06N 3/08 |
| 2021/0019568 A1 * | 1/2021 | Kurata | ................. | G06V 10/454 |
| 2022/0058169 A1 * | 2/2022 | Amzal | ................ | G06F 16/2272 |
| 2022/0075793 A1 * | 3/2022 | Jezewski | .................. | G06N 5/04 |

FOREIGN PATENT DOCUMENTS

| | | |
|---|---|---|
| JP | 2020-184212 A | 11/2020 |
| WO | 2018/180970 | 2/2020 |

OTHER PUBLICATIONS

Japanese Office Action received in corresponding Japanese Application No. 2021-189669 dated Feb. 18, 2025.

* cited by examiner

*Primary Examiner* — Maikhanh Nguyen
(74) *Attorney, Agent, or Firm* — MATTINGLY & MALUR, PC

(57) ABSTRACT

One preferred aspect of the present invention is a method of configuring a data model for learning data for machine learning, the method including, in a case where data items of a database as a basis of the learning data have a hierarchical structure of a degree of abstraction or a degree of detail, by using a filter that enables the degree of abstraction or the degree of detail of the data items to be designated for each of the data items and sorts the data items into an objective variable and an explanatory variable, configuring a data model that extracts a data item to be used for learning data among the data items from the database.

8 Claims, 20 Drawing Sheets

| LARGE CATEGORY | MIDDLE CATEGORY | SMALL CATEGORY | INDIVIDUAL ITEM | | |
|---|---|---|---|---|---|
| CIRCULATORY SYSTEM I00-99 | ISCHEMIC HEART DISEASE I20-25 | ANGINA I20 | EXERTIONAL ANGINA | 8841212 | I208 |
| | | | ANGINA | 4139007 | I209 |
| | | MYOCARDIAL INFARCTION I21-23 | ACUTE MYOCARDIAL INFARCTION | 8832376 | I219 |
| | | | MYOCARDIAL INFARCTION | 8834919 | I219 |
| | CEREBROVASCULAR DISEASE I60-69 | CEREBRAL HEMORRHAGE I61 | CEREBELLAR HEMORRHAGE | 4319006 | I614 |
| | | | CEREBRAL HEMORRHAGE | 4319020 | I619 |
| | | CEREBRAL INFARCTION I63 | LACUNAR INFARCTION | 4341049 | I638 |
| | | | CEREBRAL INFARCTION | 8838708 | I639 |

Figure 3:
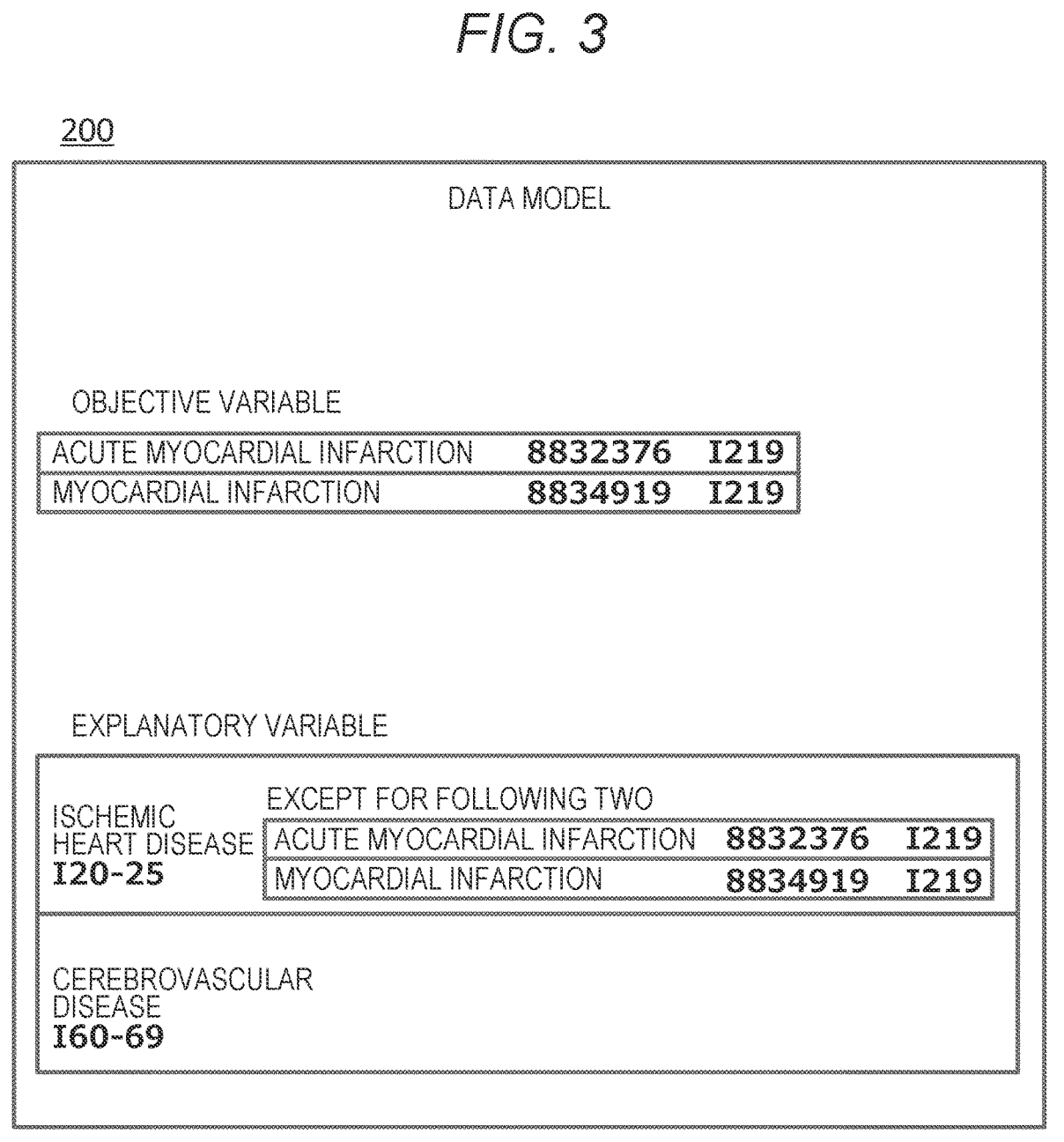

| DATA MODEL |
|---|

OBJECTIVE VARIABLE

| ACUTE MYOCARDIAL INFARCTION | 8832376 | I219 |
|---|---|---|
| MYOCARDIAL INFARCTION | 8834919 | I219 |

EXPLANATORY VARIABLE

| ISCHEMIC HEART DISEASE I20-25 | EXCEPT FOR FOLLOWING TWO | | |
|---|---|---|---|
| | ACUTE MYOCARDIAL INFARCTION | 8832376 | I219 |
| | MYOCARDIAL INFARCTION | 8834919 | I219 |

CEREBROVASCULAR DISEASE I60-69

Figure 4:
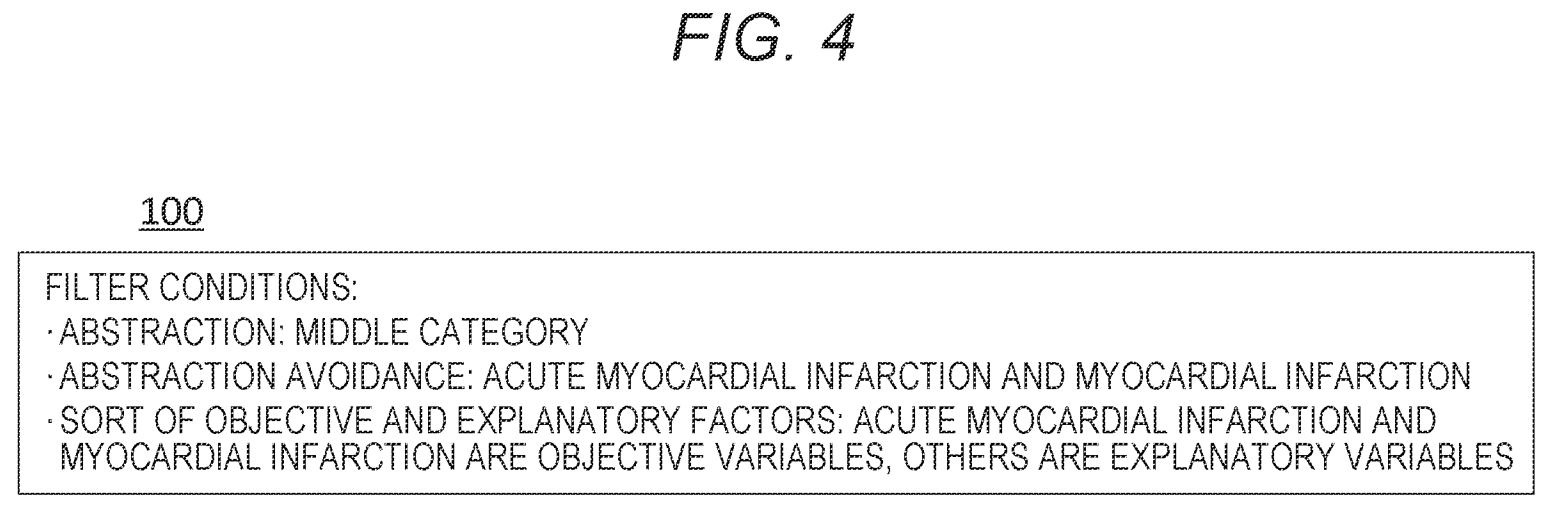

FILTER CONDITIONS:
· ABSTRACTION: MIDDLE CATEGORY
· ABSTRACTION AVOIDANCE: ACUTE MYOCARDIAL INFARCTION AND MYOCARDIAL INFARCTION
· SORT OF OBJECTIVE AND EXPLANATORY FACTORS: ACUTE MYOCARDIAL INFARCTION AND MYOCARDIAL INFARCTION ARE OBJECTIVE VARIABLES, OTHERS ARE EXPLANATORY VARIABLES

PHARMACEUTICAL FIELD

| LARGE CATEGORY | MIDDLE CATEGORY | SMALL CATEGORY | INDIVIDUAL ITEM | |
|---|---|---|---|---|
| DRUG EFFICACY CATEGORY (1) MEDICINE FOR NERVOUS SYSTEM AND SENSORY ORGANS | (1 1) NEUROCENTRAL AGENT | 1 1 2 SEDATIVE HYPNOTIC AGENT | MYSLEE TABLET 5mg | 1129009F1025 |
| | | | PHENOBAR POWDER 10% | 1125003B2031 |
| | | 1 1 6 ANTI-PARKINSON'S AGENT | AKINETON TABLET 1mg | 1162001F1066 |
| | | | PRAMIPEXOLE HYDROCHLORIDE TABLET | 1169012F2037 |
| | (1 2) PERIPHERAL NERVE AGENT | 1 2 3 AUTONOMIC NERVE AGENT | TRANCOLON TABLET 7.5mg | 1231009F1088 |
| | | | THIATON CAPSULE 5mg | 1231013M1040 |
| | | 1 2 4 ANTISPASMODIC AGENT | BUSCOPAN TABLET 10mg | 1242002F1330 |
| | | | GABALON TABLET 5mg | 1249006F1020 |

Figure 6:
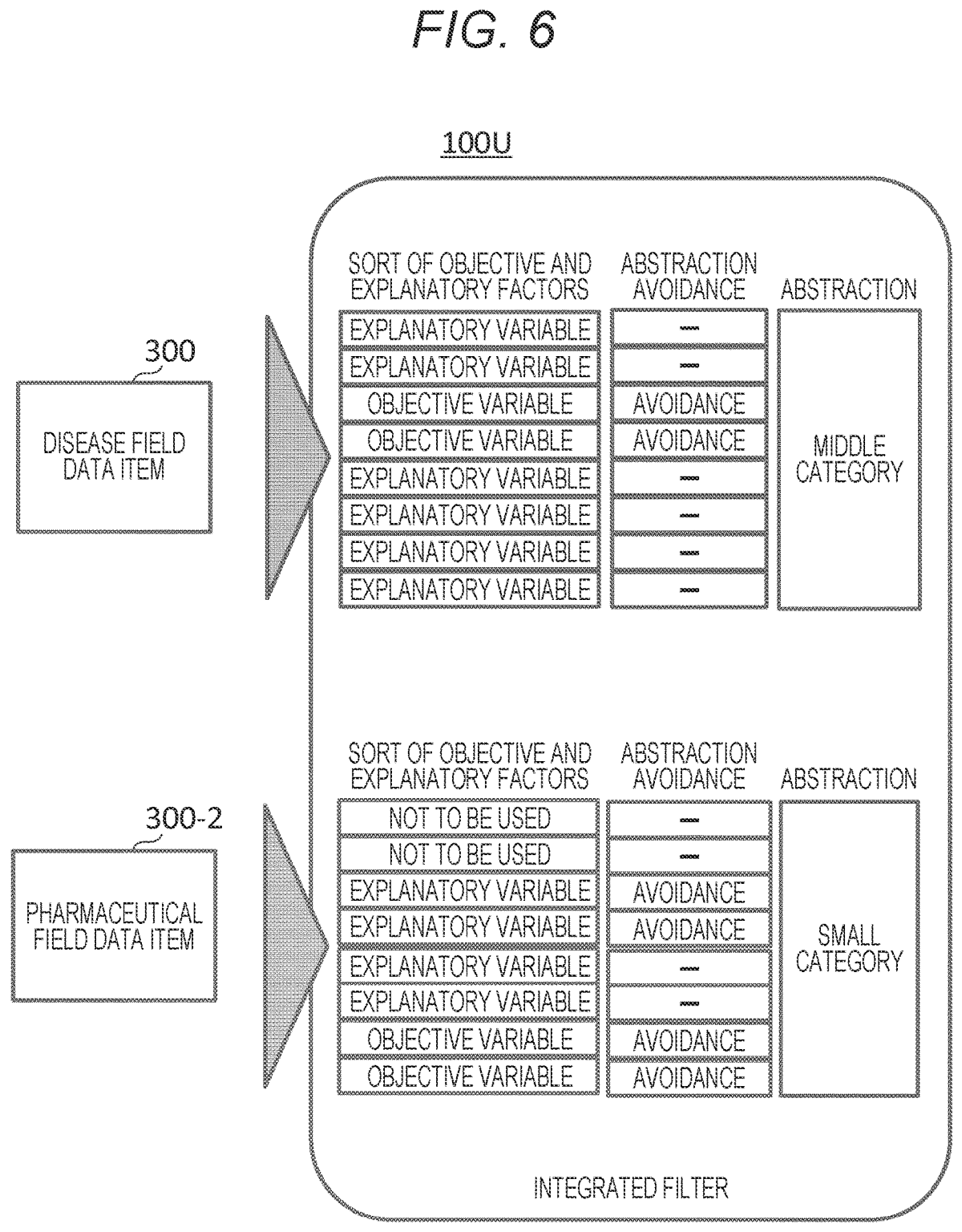

| SORT OF OBJECTIVE AND EXPLANATORY FACTORS | ABSTRACTION AVOIDANCE | ABSTRACTION |
|---|---|---|
| EXPLANATORY VARIABLE | ~~~ | |
| EXPLANATORY VARIABLE | ~~~ | |
| OBJECTIVE VARIABLE | AVOIDANCE | |
| OBJECTIVE VARIABLE | AVOIDANCE | MIDDLE CATEGORY |
| EXPLANATORY VARIABLE | ~~~ | |
| EXPLANATORY VARIABLE | ~~~ | |
| EXPLANATORY VARIABLE | ~~~ | |
| EXPLANATORY VARIABLE | ~~~ | |

300

DISEASE FIELD DATA ITEM

| SORT OF OBJECTIVE AND EXPLANATORY FACTORS | ABSTRACTION AVOIDANCE | ABSTRACTION |
|---|---|---|
| NOT TO BE USED | ~~~ | |
| NOT TO BE USED | ~~~ | |
| EXPLANATORY VARIABLE | AVOIDANCE | |
| EXPLANATORY VARIABLE | AVOIDANCE | SMALL CATEGORY |
| EXPLANATORY VARIABLE | ~~~ | |
| EXPLANATORY VARIABLE | ~~~ | |
| OBJECTIVE VARIABLE | AVOIDANCE | |
| OBJECTIVE VARIABLE | AVOIDANCE | |

300-2

PHARMACEUTICAL FIELD DATA ITEM

INTEGRATED FILTER

SICKNESS AND PHARMACEUTICAL INTEGRATED DATA MODEL

INTEGRATED OBJECTIVE VARIABLE

| ACUTE MYOCARDIAL INFARCTION | 8832376 | I219 |
|---|---|---|
| MYOCARDIAL INFARCTION | 8834919 | I219 |

| BUSCOPAN TABLET 10mg | 1242002F1330 |
|---|---|
| GABALON TABLET 5mg | 1249006F1020 |

INTEGRATED EXPLANATORY VARIABLE

| ISCHEMIC HEART DISEASE I20-25 | EXCEPT FOR FOLLOWING TWO | | |
|---|---|---|---|
| | ACUTE MYOCARDIAL INFARCTION | 8832376 | I219 |
| | MYOCARDIAL INFARCTION | 8834919 | I219 |

CEREBROVASCULAR DISEASE
I60-69

| 1 1 2 SEDATIVE HYPNOTIC AGENT | TWO IN SMALL CATEGORY 112 ARE NOT TO BE USED |
|---|---|

1 1 6
ANTI-PARKINSON'S AGENT
FOLLOWING TWO ARE INDIVIDUAL EXPLANATORY VARIABLES

| AKINETON TABLET 1mg | 1162001F1066 |
|---|---|
| PRAMIPEXOLE HYDROCHLORIDE TABLET | 1169012F2037 |

1 2 3
AUTONOMIC NERVE AGENT 1 2 4
ANTISPASMODIC AGENT
EXCEPT FOR FOLLOWING TWO

| BUSCOPAN TABLET 10mg | 1242002F1330 |
|---|---|
| GABALON TABLET 5mg | 1249006F1020 |

Figure 8:
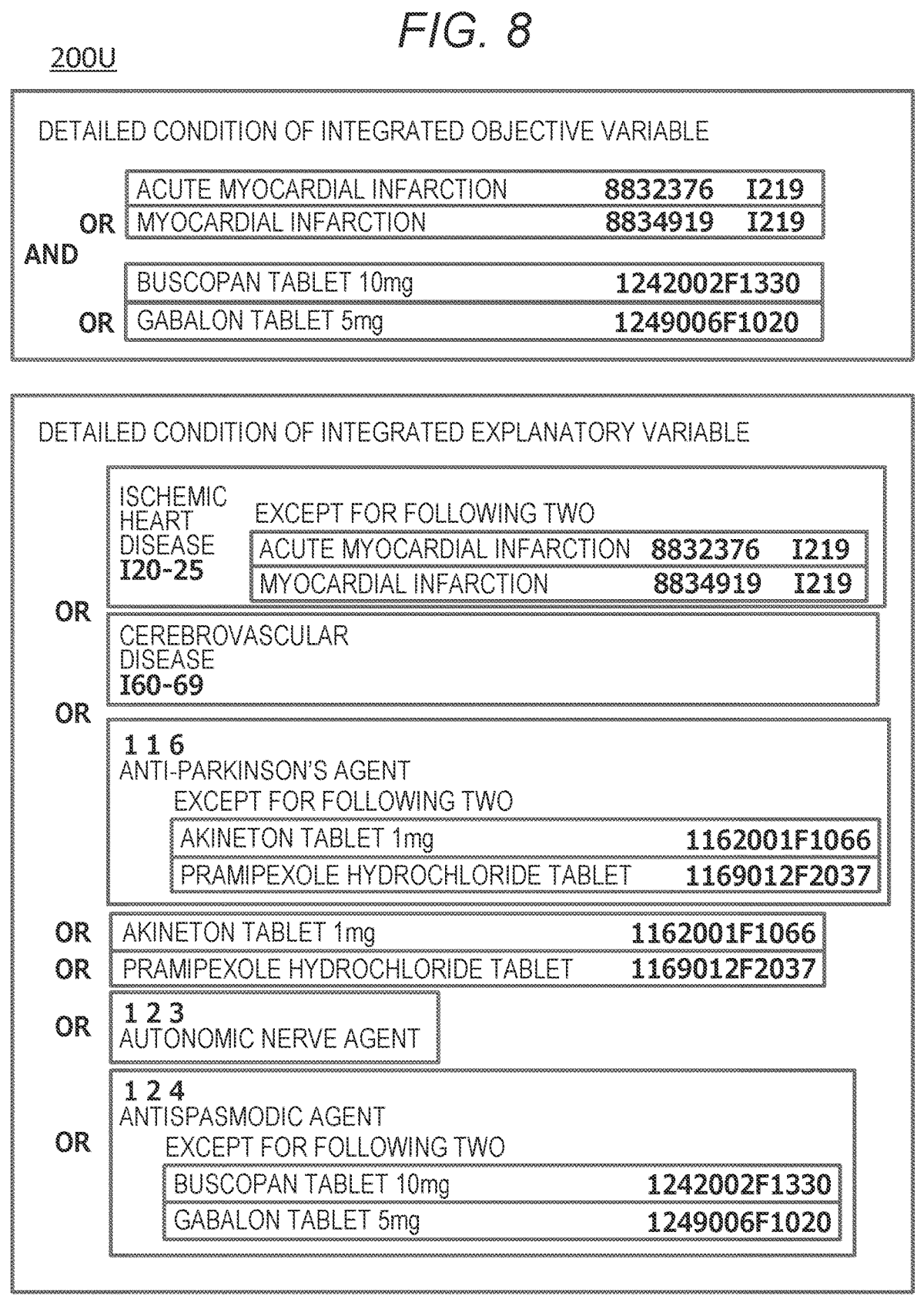

DETAILED CONDITION OF INTEGRATED OBJECTIVE VARIABLE

|  | ACUTE MYOCARDIAL INFARCTION | 8832376 | I219 |
| OR | MYOCARDIAL INFARCTION | 8834919 | I219 |

AND

|  | BUSCOPAN TABLET 10mg | 1242002F1330 |
| OR | GABALON TABLET 5mg | 1249006F1020 |

---

DETAILED CONDITION OF INTEGRATED EXPLANATORY VARIABLE

ISCHEMIC HEART DISEASE I20-25

EXCEPT FOR FOLLOWING TWO

| ACUTE MYOCARDIAL INFARCTION | 8832376 | I219 |
| MYOCARDIAL INFARCTION | 8834919 | I219 |

OR

CEREBROVASCULAR DISEASE I60-69

OR

1 1 6
ANTI-PARKINSON'S AGENT
   EXCEPT FOR FOLLOWING TWO

| AKINETON TABLET 1mg | 1162001F1066 |
| PRAMIPEXOLE HYDROCHLORIDE TABLET | 1169012F2037 |

OR  | AKINETON TABLET 1mg | 1162001F1066 |
OR  | PRAMIPEXOLE HYDROCHLORIDE TABLET | 1169012F2037 |

OR

1 2 3
AUTONOMIC NERVE AGENT

OR

1 2 4
ANTISPASMODIC AGENT
   EXCEPT FOR FOLLOWING TWO

| BUSCOPAN TABLET 10mg | 1242002F1330 |
| GABALON TABLET 5mg | 1249006F1020 |

```
· PERSONAL ID = F20011
· MEDICAL RECEPTION NUMBER = IRE01122
· DIAGNOSIS MONTH AND YEAR = 201912
· SICKNESS NAME = ACUTE MYOCARDIAL INFARCTION
· SICKNESS NAME CODE = 8832376
· ICD10 CODE = I219
```

```
· PERSONAL ID = F20011
· PHARMACEUTICAL RECEPTION NUMBER = CRE22112
· PRESCRIPTION MONTH AND YEAR = 201912
· PHARMACEUTICAL NAME = BUSCOPAN TABLET 10mg
· DRUG EFFICACY CATEGORY CODE = 124
```

*FIG. 10*

| FIG. 10A | FIG. 10B |
|---|---|

| PERSONAL ID | RECEPTION NUMBER | MONTH AND YEAR | ACUTE MYOCARDIAL INFARCTION | MYOCARDIAL INFARCTION | BUSCOPAN TABLET | GABALON TABLET | ISCHEMIC HEART DISEASE I20-25 (EXCEPT FOR ACUTE MYOCARDIAL INFARCTION AND MYOCARDIAL INFARCTION) |
|---|---|---|---|---|---|---|---|
| F20011 | IRE01122 | 201912 | 1 | 0 | 0 | 0 | 0 |
| F20011 | CRE22112 | 201912 | 0 | 0 | 1 | 0 | 0 |
| F20011 | IRE00909 | 201911 | 0 | 0 | 0 | 0 | 0 |
| F20011 | CRE19122 | 201911 | 0 | 0 | 0 | 0 | 0 |
| F20011 | IRE00807 | 201911 | 0 | 0 | 0 | 0 | 0 |
| F20011 | CRE15118 | 201911 | 0 | 0 | 0 | 0 | 0 |
| F20011 | IRE00724 | 201910 | 0 | 0 | 0 | 0 | 0 |
| F20011 | CRE12245 | 201910 | 0 | 0 | 0 | 0 | 0 |
| F20011 | IRE00659 | 201910 | 0 | 0 | 0 | 0 | 1 |
| F20011 | CRE10019 | 201910 | 0 | 0 | 0 | 0 | 0 |

TO FIG. 10B

OBJECTIVE VARIABLE

FIG. 10B

FROM FIG. 10A

| CEREBROVASCULAR DISEASE I60-69 | ANTI-PARKINSON'S AGENT 116 (EXCEPT FOR AKINETON TABLET AND PRAMIPEXOLE HYDROCHLORIDE TABLET) | AKINETON TABLET | PRAMIPEXOLE HYDROCHLORIDE TABLET | AUTONOMIC NERVE AGENT 123 | ANTISPASMODIC AGENT 124 (EXCEPT FOR BUSCOPAN TABLET AND GABALON TABLET) |
|---|---|---|---|---|---|
| 0 | 0 | 0 | 0 | 0 | 0 |
| 0 | 0 | 0 | 0 | 0 | 0 |
| 1 | 0 | 0 | 0 | 0 | 0 |
| 0 | 1 | 1 | 0 | 0 | 0 |
| 1 | 0 | 0 | 0 | 0 | 0 |
| 0 | 1 | 0 | 1 | 1 | 0 |
| 1 | 0 | 0 | 0 | 0 | 0 |
| 0 | 0 | 1 | 0 | 1 | 0 |
| 0 | 0 | 0 | 0 | 0 | 0 |
| 0 | 0 | 1 | 0 | 0 | 1 |

EXPLANATORY VARIABLE

*FIG. 12*

INTER-FIELD COMPONENT RATIO OF INTEGRATED OBJECTIVE VARIABLE

| FIELD | LARGE CATEGORY | MIDDLE CATEGORY | SMALL CATEGORY | INDIVIDUAL ITEM | TOTAL | RATIO |
|---|---|---|---|---|---|---|
| DISEASE FIELD | 0 | 0 | 0 | 2 | 2 | 50 |
| PHARMACEUTICAL FIELD | 0 | 0 | 0 | 2 | 2 | 50 |

INTER-FIELD COMPONENT RATIO OF INTEGRATED EXPLANATORY VARIABLE

| FIELD | LARGE CATEGORY | MIDDLE CATEGORY | SMALL CATEGORY | INDIVIDUAL ITEM | TOTAL | RATIO |
|---|---|---|---|---|---|---|
| DISEASE FIELD | 0 | 2 | 0 | 0 | 2 | 29 |
| PHARMACEUTICAL FIELD | 0 | 0 | 3 | 2 | 5 | 71 |

*FIG. 13*

INTEGRATED FILTER A:
INTER-FIELD COMPONENT RATIO OF INTEGRATED OBJECTIVE VARIABLE

| FIELD | LARGE CATEGORY | MIDDLE CATEGORY | SMALL CATEGORY | INDIVIDUAL ITEM | TOTAL | RATIO |
|---|---|---|---|---|---|---|
| DISEASE FIELD | 0 | 0 | 0 | 2 | 2 | 50% |
| PHARMACEUTICAL FIELD | 0 | 0 | 0 | 2 | 2 | 50% |

DISEASE FIELD   100%   50%   0%
PHARMACEUTICAL FIELD   0%   50%   100%

INTEGRATED FILTER B:
INTER-FIELD COMPONENT RATIO OF INTEGRATED OBJECTIVE VARIABLE

| FIELD | LARGE CATEGORY | MIDDLE CATEGORY | SMALL CATEGORY | INDIVIDUAL ITEM | TOTAL | RATIO |
|---|---|---|---|---|---|---|
| DISEASE FIELD | 0 | 0 | 0 | 1 | 1 | 33% |
| PHARMACEUTICAL FIELD | 0 | 0 | 0 | 2 | 2 | 67% |

DISEASE FIELD   100%   50%   0%
PHARMACEUTICAL FIELD   0%   50%   100%

INTEGRATED FILTER C:
INTER-FIELD COMPONENT RATIO OF INTEGRATED OBJECTIVE VARIABLE

| FIELD | LARGE CATEGORY | MIDDLE CATEGORY | SMALL CATEGORY | INDIVIDUAL ITEM | TOTAL | RATIO |
|---|---|---|---|---|---|---|
| DISEASE FIELD | 0 | 0 | 0 | 3 | 3 | 60% |
| PHARMACEUTICAL FIELD | 0 | 0 | 0 | 2 | 2 | 40% |

DISEASE FIELD   100%   50%   0%
PHARMACEUTICAL FIELD   0%   50%   100%

FIG. 17

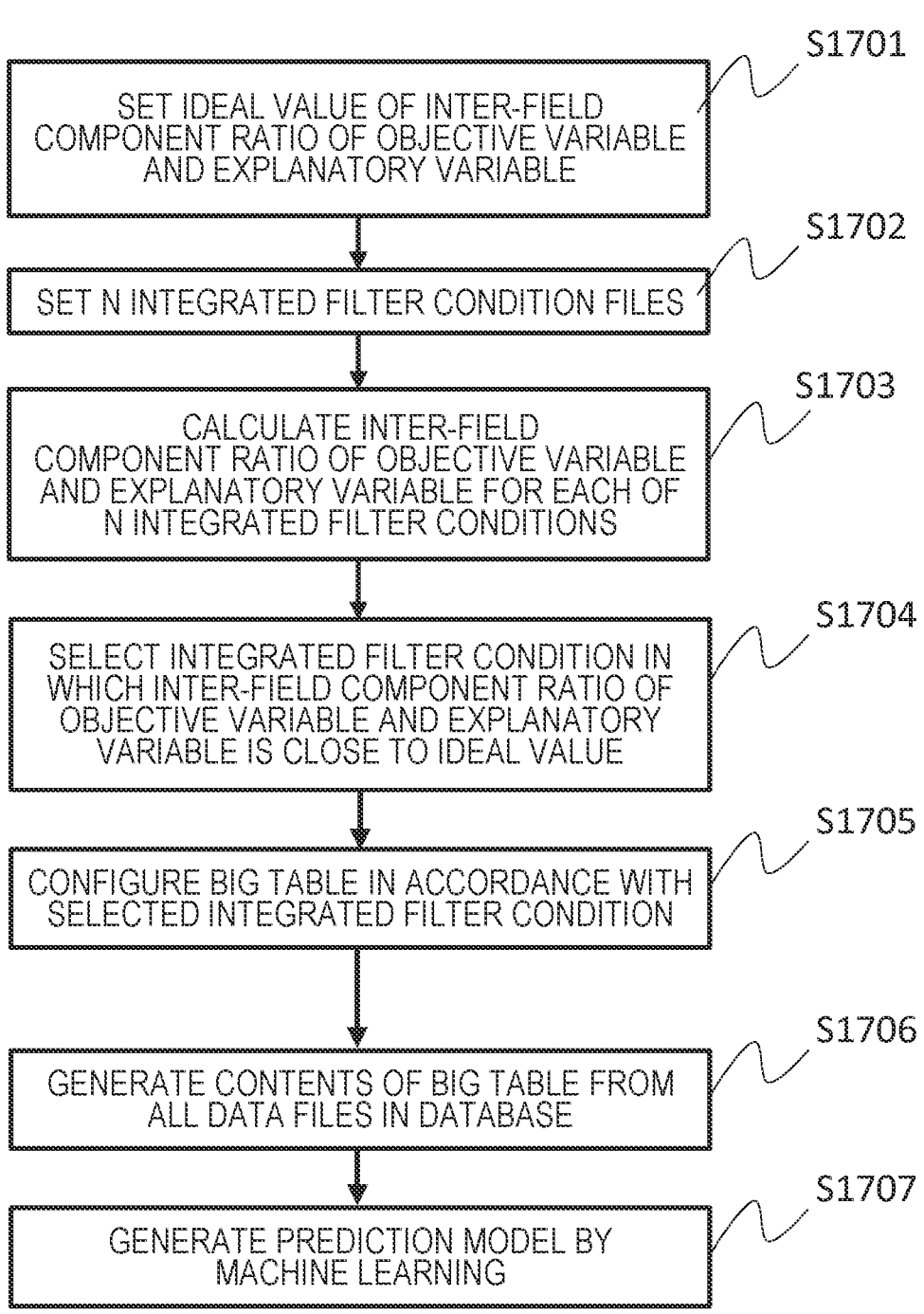

SET IDEAL VALUE OF INTER-FIELD COMPONENT RATIO OF OBJECTIVE VARIABLE AND EXPLANATORY VARIABLE — S1701

SET N INTEGRATED FILTER CONDITION FILES — S1702

CALCULATE INTER-FIELD COMPONENT RATIO OF OBJECTIVE VARIABLE AND EXPLANATORY VARIABLE FOR EACH OF N INTEGRATED FILTER CONDITIONS — S1703

SELECT INTEGRATED FILTER CONDITION IN WHICH INTER-FIELD COMPONENT RATIO OF OBJECTIVE VARIABLE AND EXPLANATORY VARIABLE IS CLOSE TO IDEAL VALUE — S1704

CONFIGURE BIG TABLE IN ACCORDANCE WITH SELECTED INTEGRATED FILTER CONDITION — S1705

GENERATE CONTENTS OF BIG TABLE FROM ALL DATA FILES IN DATABASE — S1706

GENERATE PREDICTION MODEL BY MACHINE LEARNING — S1707

DATA MODEL CONFIGURATION METHOD FOR LEARNING DATA, LEARNING DATA GENERATION APPARATUS, AND MACHINE LEARNING METHOD

CROSS-REFERENCE TO RELATED APPLICATION

The present application claims priority from Japanese application JP2021-189669, filed on Nov. 22, 2021, the contents of which is hereby incorporated by reference into this application.

BACKGROUND OF THE INVENTION

1. Field of the Invention

The present invention relates to generation of learning data used for machine learning, and particularly relates to a technique for converting data in a predetermined format into data in a desired format to generate learning data.

2. Description of the Related Art

In recent years, inference using a machine learning model has been put to practical use. The machine learning model is trained by learning data, and functions as a function approximator that obtains a predetermined output (answer) for a predetermined input (question).
Configurations such as a Deep Neural Network (DNN) constituting a machine learning model and a machine learning technique for training the machine learning are known.

While various applications such as image analysis, voice recognition, and data analysis are known for inference using a machine learning model, it is important to obtain appropriate learning data in order to accurately perform inference of a desired use.

As learning data for performing supervised learning, it is necessary to prepare a set of a question (explanatory variable) and a correct answer (objective variable). In addition, it is desirable that the learning data have sufficient quality and quantity.

The cost of creating such learning data is a practical problem. At this time, it is expected to efficiently prepare learning data of sufficient quality and quantity by extracting and using a set of an explanatory variable and an objective variable from various databases already existing.

JP 2020-184212 A has shown that by selecting features in stages, features that greatly affect an output result of a learning model can be narrowed down in stages.

SUMMARY OF THE INVENTION

In JP 2020-184212 A, the features are selected in stages from a large category to a middle category and a small category, but there is no direction of abstraction or range designation for selecting abstraction.

That is, depending on a type of inference desired to be executed by a machine learning model, it is necessary to perform adjustment such as abstracting a part of the learning data and not abstracting other parts. However, conventionally, partially fine setting of an objective function and partially fine setting of an explanatory variable are difficult.

Therefore, an object of the present invention is to enable partial abstraction or detailing when learning data is generated from existing data.

One preferred aspect of the present invention is a method of configuring a data model for learning data for machine learning, the method including, in a case where data items of a database as a basis of the learning data have a hierarchical structure of a degree of abstraction or a degree of detail, by using a filter that enables the degree of abstraction or the degree of detail of the data items to be designated for each of the data items and sorts the data items into an objective variable and an explanatory variable, configuring, by an information processing device, a data model that extracts a data item to be used for learning data among the data items from the database.

Another preferred aspect of the present invention is a learning data generation apparatus that generates learning data for machine learning, the learning data generation apparatus including a learning data generator, in which in a case where data items of a database as a basis of the learning data have a hierarchical structure of a degree of abstraction or a degree of detail, by using a filter that enables the degree of abstraction or the degree of detail of the data items to be designated for each of the data items and sorts the data items into an objective variable and an explanatory variable, the learning data generator extracts data as the objective variable or the explanatory variable to be used for the learning data from the database.

Another preferable aspect of the present invention is a machine learning method including training, by an information processing device, a machine learning model by using the objective variable and the explanatory variable obtained above.

When learning data is generated from existing data, partial abstraction or detailing is possible.

BRIEF DESCRIPTION OF THE DRAWINGS

FIG. 2 is a table illustrating an example of data items of a disease field;

FIG. 3 is a table illustrating an example of a data model;

FIG. 4 is a table illustrating filter conditions;

FIG. 5 is a table illustrating an example of data items of a pharmaceutical field;

FIG. 6 is a table illustrating one example of integrated filter conditions;

FIG. 7 is a table illustrating an example of an integrated data model;

FIG. 8 is a table illustrating detailed conditions of the integrated data model;

FIG. 9B is a table illustrating a data example of a disease database;

FIG. 9C is a table illustrating a data example of a pharmaceutical database;

FIG. 10, which is comprised of partial views shown in FIGS. 10A and 10B, is a table illustrating an example of a big table;

FIG. 12 is a table illustrating an example of inter-field component ratios of variables;

FIG. 13 is an image diagram illustrating an example of a GUI that displays the inter-field component ratios of variables;

FIG. 17 is a processing flowchart of learning data generation.

DESCRIPTION OF THE PREFERRED EMBODIMENTS

Figure 1:
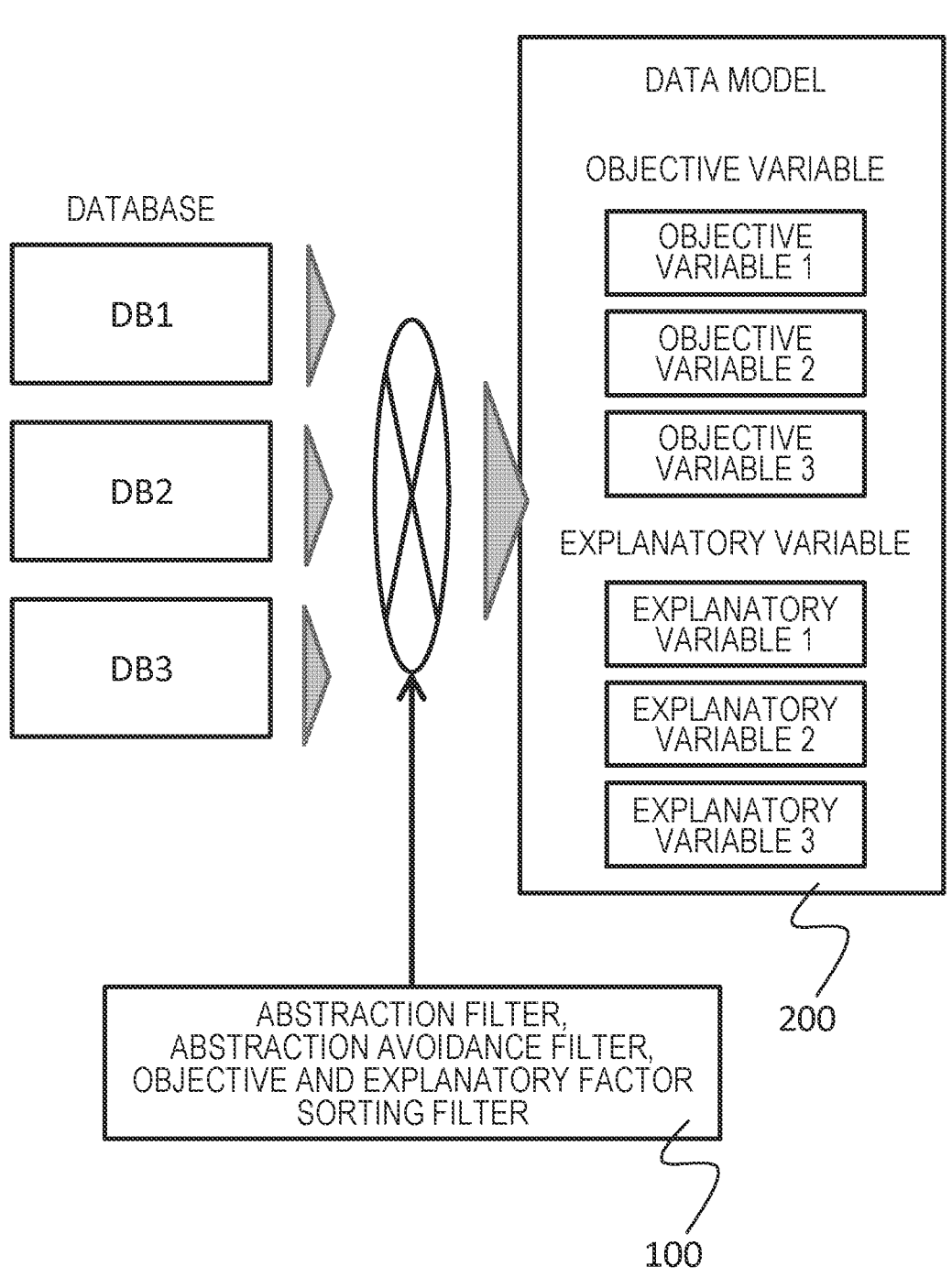
FIG. 1 is a conceptual diagram illustrating a concept of a data model generation method of learning data.

Hereinafter, embodiments of the present invention will be described with reference to the drawings. Note that the present invention is not limited by the following description.

In configurations of embodiments described below, the same reference numerals are commonly used for the same parts or parts having similar functions in different drawings, and redundant description may be omitted.

In a case where there are a plurality of elements having the same or similar functions, the same reference numerals may be attached with different subscripts for description. However, in a case where it is not necessary to distinguish a plurality of elements, the subscripts may be omitted.

Notations such as "first", "second", and "third" in the present specification and the like are attached to identify components, and do not necessarily limit the number, order, or contents of the components. In addition, a number for identifying a component is used for each context, and a number used in one context does not necessarily indicate the same configuration in another context. The notations do not prevent a component identified by a certain number from also functioning as a component identified by another number.

Positions, sizes, shapes, ranges, and the like of the respective components illustrated in the drawings and the like may not represent actual positions, sizes, shapes, ranges, and the like in order to facilitate understanding of the invention. Therefore, the present invention is not necessarily limited to the positions, size, shapes, ranges, and the like disclosed in the drawings and the like.

The publications, patents, and patent applications cited in the present specification constitute a part of the description of the present specification as such.

Components expressed in the singular herein are intended to include the plural unless the context clearly dictates otherwise.

In the embodiment described below, an appropriate data model is provided when a data analysis environment service obtained by multiplying data of a plurality of fields is provided. In the present embodiment, the data model has a function of defining at least an element of data serving as an objective variable and an element of data serving as an explanatory variable. In addition, the data model may include a definition of a relationship between data elements as detailed information to be added. In this case, the data model is defined as a "data model that defines an element of data serving as an objective variable, an element of data serving as an explanatory variable, and a relationship between data elements".

Conventionally, it has been difficult to adjust a level of degree of abstraction between fields and adjust a level of degree of detail within a field. That is, there is no direction of abstraction of data and no range designation for stopping abstraction, and partially fine setting of an objective function and partially fine setting of an explanatory variable have been difficult.

In the following embodiment, an integrated filter having three types of filter functions of an objective variable and explanatory variable sorting filter, an abstraction avoidance filter, and an abstraction filter is applied to a most detailed data layer. Thus, an appropriate data model is provided when a data analysis environment service obtained by multiplying data in a plurality of fields is provided.

Furthermore, automatic tuning of parameters of the integrated filter enables calculation of an optimal integrated filter. That is, it is possible to calculate an optimal integrated filter and achieve an optimal inter-field balance.

In such an embodiment, it is possible to provide a data service including a proposal of an integrated data model suitable for learning data, and it is also possible to obtain learning data integrating data of a plurality of fields.

FIG. 1 is a conceptual diagram illustrating a concept of a data model generation method of learning data described in the embodiment. A data model 200 is generated by applying a filter 100 to data items of existing databases DB1, DB2, and DB3.

An existing database generally has a hierarchical structure defined by a database creator, and is configured in stages from a high-order data item (category) to a low-order data item (individual item) such as a large category, a middle category, a small category, and an individual item. As the databases DB1, DB2, and DB3, various existing databases can be used. As the database, a database of one or a plurality of fields can be used.

In the filter 100, an expert or the like having knowledge in the field sets filter conditions in accordance with an application and purpose of a machine learning model to be created, and stores the filter conditions as filter data. The filter 100 acts on data items of a database DB.

The filter 100 includes an abstraction filter that groups data items of the database into high-order data items, an abstraction avoidance filter that does not apply the abstraction filter to a predetermined data item, an objective and explanatory factor sorting filter that sorts the data items of the database into an objective variable and an explanatory variable, and the like. The filter 100 also designates an integrated condition when integrating a plurality of databases.

The data model 200 is a data model at a time of generating (extracting) the learning data from the data of the database. A data item to be one or a plurality of objective variables and a data item to be one or a plurality of explanatory variables are designated. Data is extracted from the database DB in accordance with a definition of the data model 200, and then, learning data can be generated.

First Embodiment

An embodiment of generating learning data from an existing database will be described. In this embodiment, learning data is generated when machine learning is performed to determine whether a person who has developed a specific disease had developed another disease. In the present embodiment, an appropriate data model for generating learning data is provided.

FIG. 2 is a table illustrating one example of data items 300 of a database regarding diseases of a circulatory system. Symbols of alphabets and numbers in the table are codes of ICD10, which is an international disease category, and represent disease names.

In the example in FIG. 2, the large category has the entire diseases of the circulatory system, the middle category has two categories of "ischemic heart disease" and "cerebrovascular disease" roughly divided into the heart and the brain, the small category has four categories, and eight specific disease names are defined as the individual items. As described above, a hierarchical structure is often employed for the data items indicating classification of data of the database. The codes of seven digits corresponding to the codes of ICD10 are codes designated by the Ministry of Health, Labour and Welfare.

In the actual database, for example, data is stored for each patient ID and event in accordance with the individual items illustrated in FIG. 2.

FIG. 3 illustrates one example of a structure of the data model 200 to which the learning data should conform. The learning data generally includes a set of an input (explanatory variable) of a machine learning model and an expected output (objective variable). By using actual data in the database, it is possible to obtain an objective variable which is a correct answer for an explanatory variable which is a question.

In a case where the learning data is generated from the database having the data items in FIG. 2 in accordance with the data model in FIG. 3, the machine learning model can perform learning to estimate, for example, a risk of a patient having a symptom of "ischemic heart disease" (except for "acute myocardial infarction" and "myocardial infarction") or "cerebrovascular disease" as an explanatory variable to develop a symptom of "acute myocardial infarction" or "myocardial infarction" which is an objective variable. Alternatively, conversely, the explanatory variable may be estimated from the objective variable.

In the present embodiment, in order to automatically generate learning data from the database, a data model is generated and processed with a concept of a filter.

FIG. 4 is an example of a filter for extracting learning data according to the data model 200 in FIG. 3 from the database defined by the data items 300 in FIG. 2.

In the filter 100, the abstraction filter designates the degree of abstraction as a middle category. This designates that, among the data items 300 in FIG. 2, "ischemic heart disease" and "cerebrovascular disease" as the middle category are used as data items. That is, the large category, the small category, and the individual items are ignored, and the middle category corresponding to the individual items is extracted as the learning data.

The abstraction avoidance filter indicates that the abstraction filter is not applied to the individual items "acute myocardial infarction" and "myocardial infarction". Therefore, data of these individual items is extracted as such in the learning data.

In the objective and explanatory factor sorting filter, "acute myocardial infarction" and "myocardial infarction" are designated as objective variables and the others are designated as explanatory variables for the extracted data.

When the filter 100 of conditions of FIG. 4 is applied to the data items 300 in FIG. 2, the data model 200 in FIG. 3 can be generated, and when data is extracted from the database in accordance with the data model, learning data is generated.

The present embodiment makes it possible to generate learning data in which data granularity (degree of abstraction of data) is arbitrarily changed on the basis of the existing database, and makes it possible to execute learning suitable for use and purpose of the machine learning model. In the above example, the machine learning model can be configured such that the risk focusing on the acute myocardial infarction and the myocardial infarction of the individual items is estimated on the basis of a disease in the middle category.

Second Embodiment

In a second embodiment, an example of integrating databases of a plurality of fields to generate learning data will be described. Here, an example of integrating a database of a disease field and a database of a pharmaceutical field will be described. It is important in a machine learning field to combine data in a plurality of fields to create integrated data in this manner. However, if both data are simply combined, data of low importance is also included, an amount of data becomes enormous, and a load of learning processing becomes large. Therefore, data selection at a time of integration is important.

In this example, an example will be described in which a database of the disease field based on the data items 300 illustrated in FIG. 2 and a database of the pharmaceutical field based on data items 300-2 illustrated in FIG. 5 are integrated to generate learning data. This is a case where machine learning is performed to determine what kind of explanatory variable a person suffering from a certain disease has while a certain drug is prescribed. In the present embodiment, it is possible to adjust a level of degree of abstraction (degree of detail) between fields and adjust a level of degree of abstraction (degree of detail) within a field.

FIG. 5 illustrates data items 300-2 of a database of the pharmaceutical field regarding pharmaceuticals for nervous system and sensory organ. The configuration is similar to the configuration of the database of the disease category in FIG. 2, and the codes of medicine are indicated in the individual items. In a data structure in FIGS. 2 and 5, the category has three hierarchies, but may have one hierarchy or four or more hierarchies. That is, the number of hierarchies of category is arbitrary by a database designer.

FIG. 6 is a diagram illustrating a concept of an integrated filter 100U that integrates the data items 300 of the database of the disease field and the data items 300-2 of the database of the pharmaceutical field. As in the first embodiment, the filter includes an abstraction filter, an abstraction avoidance filter, and an objective and explanatory factor sorting filter.

As illustrated in FIG. 6, in the filter condition, the objective and explanatory factor sorting filter and the abstraction avoidance filter are set for each individual item. In the example illustrated in FIGS. 2 and 5, both the data items 300 of the disease field and the data items 300-2 of the pharmaceutical field have eight individual items. FIG. 6 illustrates the filter condition for each individual item in an arrangement order of the data items illustrated in FIGS. 2 and 5. Note that the number of items is one example, and the number is arbitrary by a filter designer.

The abstraction filter is set for each database. In this example, the data items of the disease field are abstracted into the middle category, and the data items of the pharmaceutical field are abstracted into the small category.

The filter condition for the data items 300 of the disease field is similar to the filter condition in the first embodiment.

As filter conditions for the data item 300-2 of the pharmaceutical field, in the objective and explanatory factor sorting filter, "Buscopan tablet 10 mg" and "Gabalon tablet 5 mg" are designated as objective variables, "Myslee tablet 5 mg" and "Phenobar powder 10%" are designated as not to be used, and the others are designated as explanatory variables. In the abstraction filter, a small category is designated as an abstraction level. In the abstraction avoidance filter, "Akineton tablet 1 mg", "Pramipexole hydrochloride tablet", "Buscopan tablet 10 mg", and "Gabalon tablet 5 mg" are used as individual items as such.

FIG. 7 is a diagram illustrating an example of an integrated data model 200U integrated by the integrated filter 100U.

"Acute myocardial infarction" and "myocardial infarction" are extracted as objective variables from the individual items of the disease field. In addition, "Buscopan tablet 10 mg" and "Gabalon tablet 5 mg" are extracted as objective variables from the individual items of the pharmaceutical field.

As explanatory variables, "ischemic heart disease (except for two individual items as objective variables)" and "cerebrovascular disease" of the middle category are extracted from the data items of the disease field. As explanatory variables, "sedative hypnotic agent (two individual items are not to be used)", "anti-Parkinson's agent (two individual items are abstraction avoidance)", "autonomic nerve agent", and "antispasmodic agent (two individual items as objective variables are abstraction avoidance) of a small category are extracted from data items of the pharmaceutical field.

In this manner, the degree of abstraction of data used for variables can be freely set, such as setting for each category and using an individual item as such. For example, it is possible to precisely set an explanatory variable by using an individual item for a data item to be focused on, grouping items with low importance by category, and the like. In the above example, both the objective variable and the explanatory variable are extracted from each database, but only the objective variable or only the explanatory variable may be extracted.

FIG. 8 schematically illustrates detailed conditions of a data model for integrating variables obtained from the database of the disease field and variables obtained from the database of the pharmaceutical field. An integrated objective variable has an objective variable of "acute myocardial infarction" or "myocardial infarction" and has an objective variable of "Buscopan tablet 100 mg" or "Gabalon tablet 5 mg". An integrated explanatory variable is assumed to have any of the explanatory variables illustrated in FIG. 8.

The learning data obtained by this data model is suitable for a person who has symptoms of "acute myocardial infarction" or "myocardial infarction" and who has a history of being prescribed "Buscopan tablet 100 mg" or "Gabalon tablet 5 mg" to learn which one of various medical histories or medication as objective variables is deeply related to.

The above example is one example, and the integrated objective variable and the integrated explanatory variable can be created by combining the objective variable and the explanatory variable obtained from the plurality of databases under a desired condition by a well-known logical operation in accordance with the content of the estimation performed by the machine learning model.

Figure 9A:
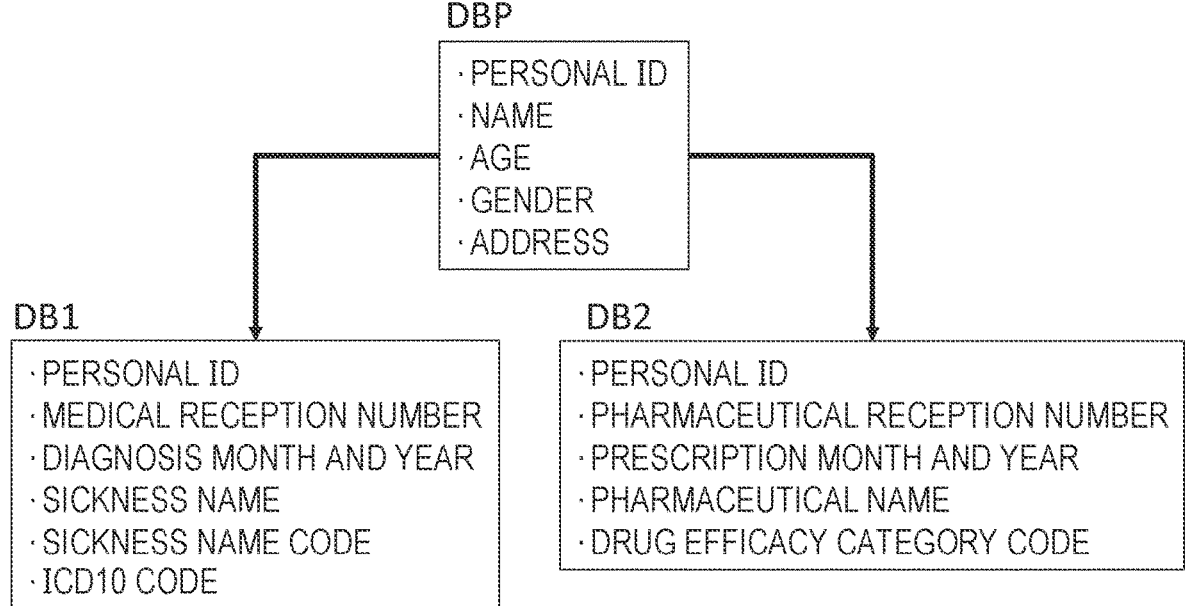
FIG. 9A is a table illustrating a data configuration example of a database.

FIG. 9A is a conceptual diagram illustrating a configuration example of data files of the database DB1 of the disease field and the database DB2 of the pharmaceutical field. The two databases DB1 and DB2 can be cross-referenced by a personal ID. A personal database DBP stores a personal ID and other bibliographic items. The same applies to the following description, but the content of the bibliographic items is arbitrary.

FIG. 9B is a diagram illustrating an example of a disease reception file 901 which is the content of one data file of the database DB1 of the disease field.

Bibliographic items such as a medical reception number and diagnosis month and year, and individual items such as a disease name, a disease name code, and an ICD10 code are recorded in association with the personal ID. The individual items are hierarchized in the category illustrated in FIG. 2.

FIG. 9C is a diagram illustrating an example of a pharmaceutical reception file 902 which is the content of one data file of the database DB2 of the pharmaceutical field. Bibliographic items such as a pharmaceutical reception number and prescription month and year, and individual items such as a pharmaceutical name and a drug efficacy category code are recorded in association with a personal ID. The individual items are hierarchized in the category illustrated in FIG. 5.

A large number of data files exemplified in FIGS. 9B and 9C are stored in the database DB1 of the disease field and the database DB2 of the pharmaceutical field. The data file can be identified by a medical reception number or a pharmaceutical reception number. Data is extracted from these data based on the data model illustrated in FIG. 7.

Note that an example of the data file described above is an independent data file for each event of medical care or prescription for each personal ID, but may be data integrated for each personal ID in advance.

FIG. 10, which is comprised of partial views shown in FIGS. 10A and 10B, illustrates an example in which the integrated filter 100U in FIG. 6 is applied to the database DB1 of the disease field and the database DB2 of the pharmaceutical field, and the data items of the integrated data model 200U in FIG. 7 are extracted. For each individual item or abstracted item illustrated in FIG. 7, whether to be applicable is indicated by 1 and 0.

Thereafter, a data file is extracted on the basis of the detailed conditions illustrated in FIG. 8, and then, desired learning data is obtained.

The example in FIG. 10 illustrates an example in which the contents of the data file extracted by the integrated filter 100U are integrated as a big table 1000. The first line from the top corresponds to the content of the disease reception file 901 in FIG. 9B, and the second line from the top corresponds to the content of the pharmaceutical reception file 902 in FIG. 9C.

Each of the database DB1 of the disease field and the database DB2 of the pharmaceutical field includes a plurality of files, and a plurality of files are usually associated with one personal ID. In the example in FIG. 10, ten data files associated with an individual with a personal ID "F20011" are illustrated. As described above, the extracted items are classified into the objective variable and the explanatory variable by the objective and explanatory factor sorting filter.

In accordance with a logical formula of the detailed conditions of the data model in FIG. 8, from this big table 1000, ("acute myocardial infarction" or "myocardial infarction") and ("Buscopan tablet 100 mg" or "Gabalon tablet 5 mg") are set as integrated objective variables. In addition, an integrated explanatory variable having any of the explanatory variables is used as the integrated explanatory variable.

The data with the personal ID "F20011" has both "acute myocardial infarction" and "Buscopan tablet 10 mg" as objective variables and has an integrated objective variable, and thus can be used as learning data. This learning data is used to learn what kind of integrated explanatory variable the person having the integrated objective variable has had and a relationship with each item of the integrated explanatory variable.

As described above, the extracted and integrated data is teacher data including the integrated explanatory variable (question) and the integrated objective variable (answer), and thus can be used as learning data of a machine learning model.

Third Embodiment

In the description so far, the filter 100 includes the abstraction filter that groups data items of the database into high-order data items, the abstraction avoidance filter that does not apply the abstraction filter to a predetermined data item, and the objective and explanatory factor sorting filter that sorts the data items of the database into an objective variable and an explanatory variable.

In the above example, the filter is designed from the viewpoint of whether to abstract data having a small granularity (individual item) into data having a large granularity (category). However, it is also possible to design a filter from the viewpoint of whether to detail (embody) data having a large granularity into data having a small granularity.

Figure 11:
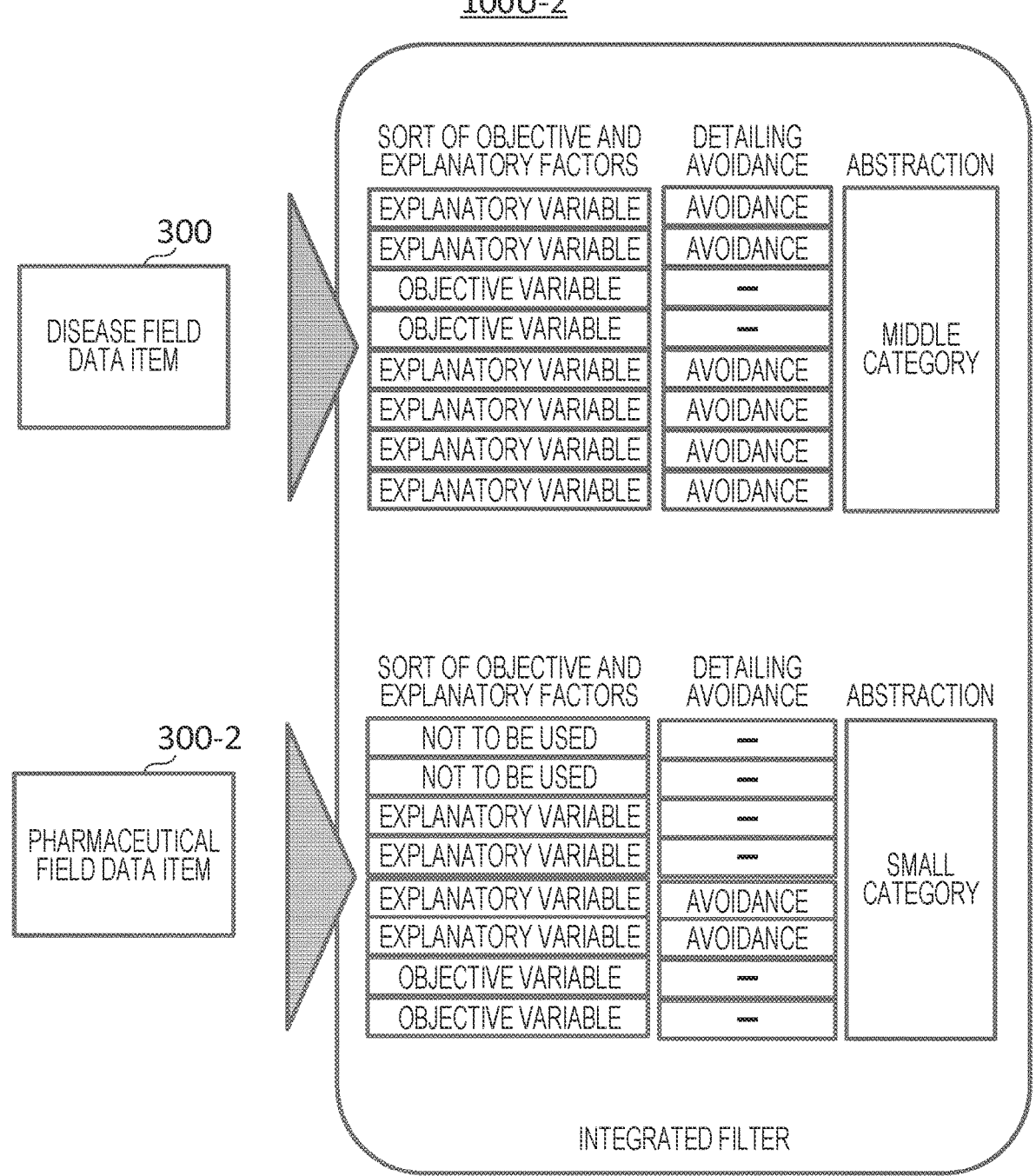
FIG. 11 is a table illustrating another example of the integrated filter conditions.

FIG. 11 is a diagram illustrating a concept of an integrated filter 100U-2 that is an alternative to the integrated filter 100U in FIG. 6. Instead of the abstraction avoidance filter in FIG. 6, a detailing avoidance filter is provided.

In the integrated filter 100U in FIG. 6, the individual items that are not abstracted by the abstraction avoidance filter are designated on the basis of abstraction of the individual items into a large category to a small category. Specifically, a first filter determines whether each individual item is an objective variable, an explanatory variable, or not to be used, a second filter determines abstraction of each individual item, and a third filter determines whether to avoid abstraction of each individual item.

In the integrated filter 100U-2 in FIG. 11, the first filter determines whether each category is an objective variable, an explanatory variable, or not to be used, the second filter determines detailing of each category, and the third filter determines whether to avoid detailing of each category.

In the integrated filter 100U-2 in FIG. 11, the individual item that is not detailed by the detailing avoidance filter (that is, the category is used as the item) is designated in principle by detailing the category into individual items. The integrated filter 100U and the integrated filter 100U-2 have exactly the same function as a result.

Fourth Embodiment

When the integrated data model is configured, there may be a case where it is desired to adjust the component ratio between the fields of the objective variable and the explanatory variable in accordance with the inference to be performed by a target machine learning model or a characteristic of an original database. In this case, it is desirable to visualize a characteristic of the integrated data model 300 U.

FIG. 12 is a diagram illustrating an example of a graphical user interface (GUI) that visualizes inter-field component ratios of the integrated data model 200U illustrated in FIGS. 7 and 8. The data granularity (degree of abstraction), the number of adoptions, and a ratio are indicated for each of the integrated objective variable and the integrated explanatory variable.

For example, for the integrated objective variable, since two individual items are adopted from each of the database of the disease field and the database of the pharmaceutical field, the ratio is 50% each.

In the integrated explanatory variable, a total of five including two middle categories ("ischemic heart disease" and "cerebrovascular disease") from the database of the disease field, three small categories ("anti-Parkinson's agent", "autonomic nerve agent", and "antispasmodic agent") from the database of the pharmaceutical field, and two individual items ("Akineton tablet 1 mg" and "Pramipexole hydrochloride tablet") are adopted.

In the example in FIG. 12, the ratio indicates the ratio of the total number without distinction between categories and individual items, but can also be indicated for each granularity of items. Alternatively, weighting may be performed in accordance with the granularity of the item.

In a preferred embodiment, the integrated data model 200U and the integrated filter 100U for the integrated data model 200U are designed by an expert having knowledge in an application field of the machine learning model and recorded in advance as data. At that time, it is desirable that a plurality of types having different characteristics are created and stored in advance so as to be selected later.

FIG. 13 is a diagram illustrating an example of the GUI that compares and visualizes characteristics of three integrated data models having different characteristics. The table on the left is similar in format to the table in FIG. 12 and shows characteristics of integrated filters A, B, and C for different integrated data models. The diagram on the right illustrates a ratio of data adopted from the two databases for each integrated data model. For example, in the integrated filter A, 50% is adopted from the disease field and the pharmaceutical field, and in the integrated filter B, 33% is adopted from the disease field and 67% is adopted from the pharmaceutical field.

A user who intends to create learning data can select an integrated data model having a desired characteristic with reference to these GUIs.

Figure 14:
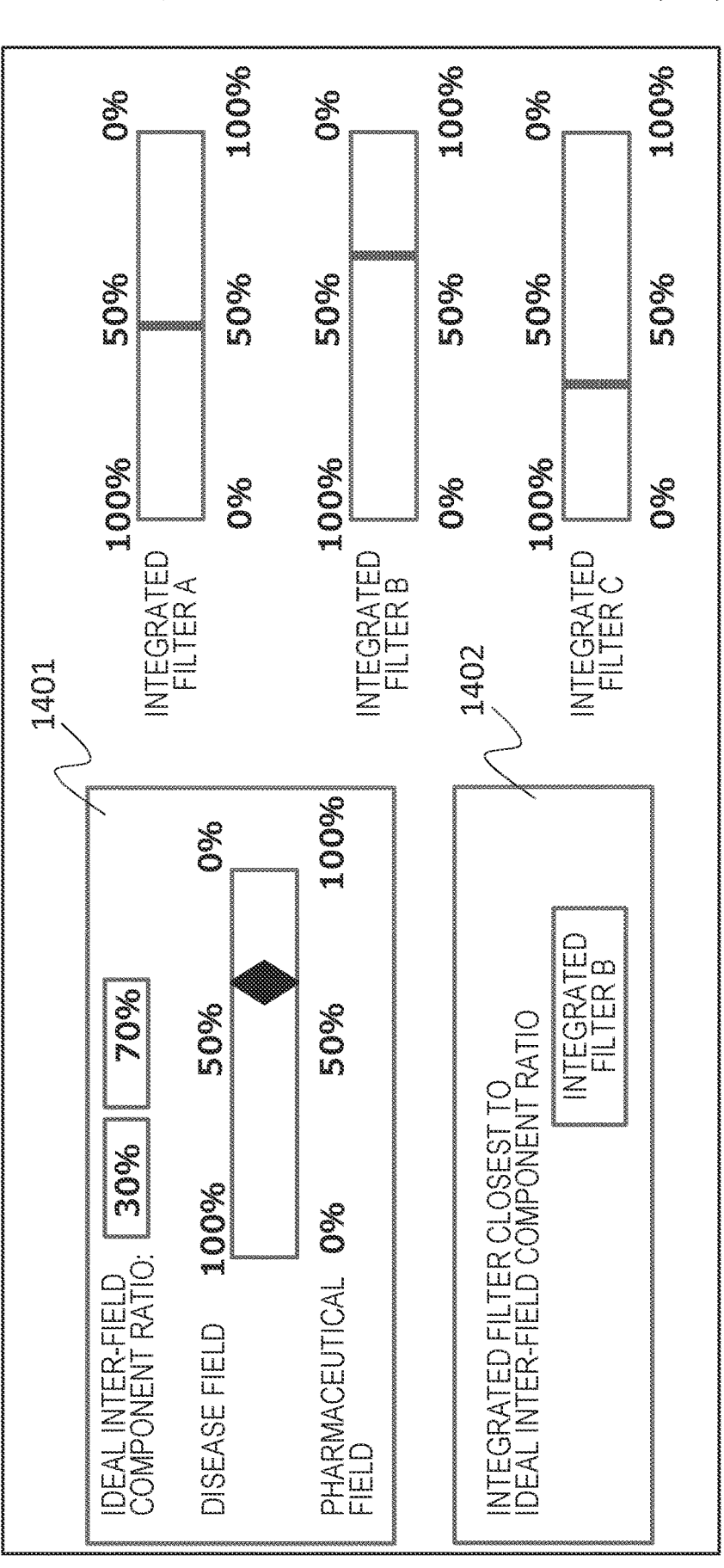
FIG. 14 is an image diagram illustrating an example of the GUI that displays the inter-field component ratios of variables.

FIG. 14 is a diagram illustrating an example of a GUI for the user to designate the characteristic of the data model and select the data model having the characteristic close to the designated characteristic.

The user designates a desired ideal inter-field component ratio in a region 1401. The system displays an integrated filter for generating a data model that is the same as or closest to the designated characteristic in a region 1402.

In this way, a data model having a desired characteristic can be used.

Fifth Embodiment

A specific system example for implementing the above embodiment and an example of a processing flow will be described.

Figure 15:
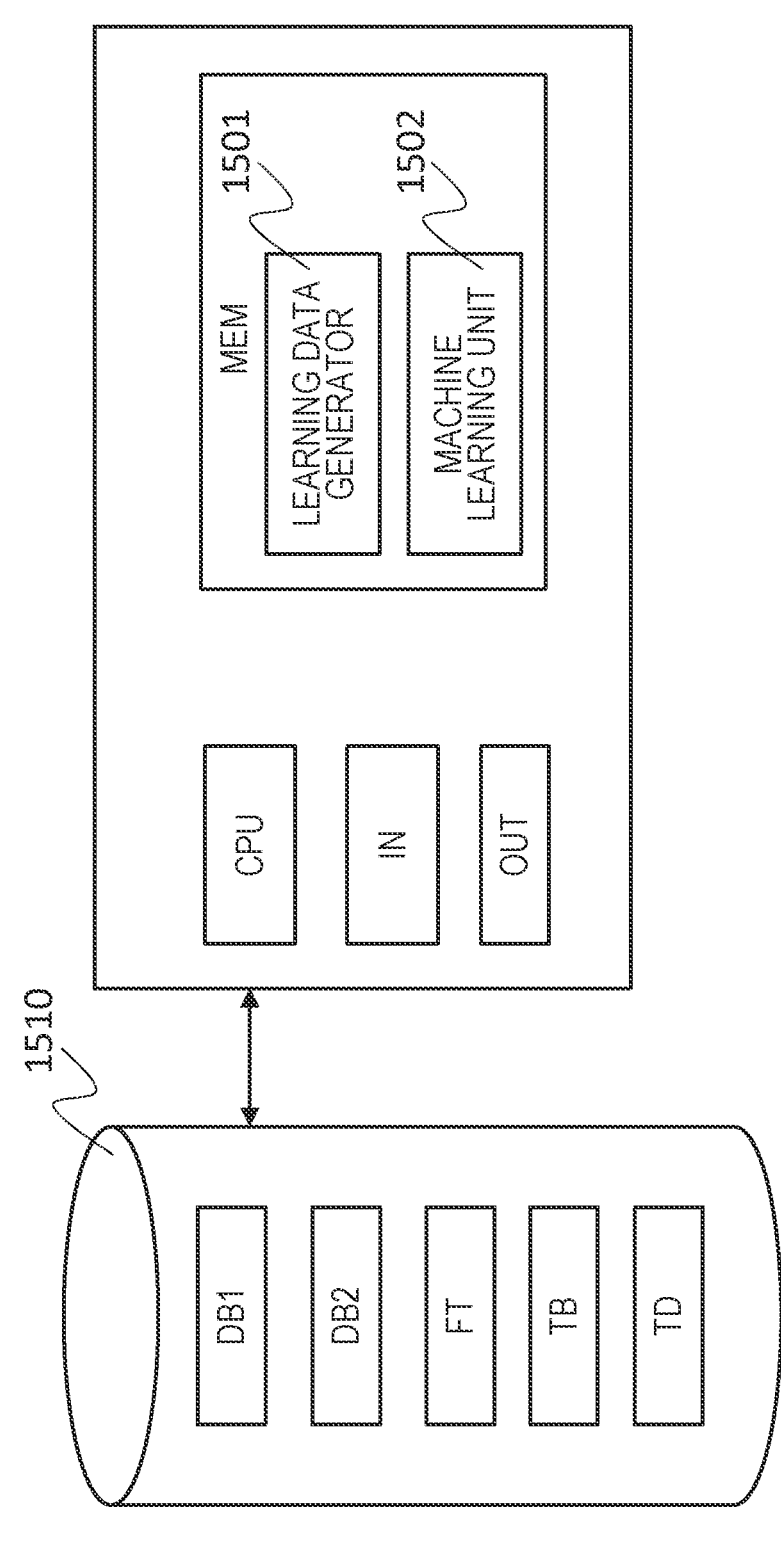
FIG. 15 is a block diagram of a learning data generation system.

FIG. 15 is a block diagram of a learning data generation system for generating learning data based on a desired data model by applying an integrated filter to databases of a plurality of fields.

A learning data generation system 1500 can be configured by an information processing device such as a general server. As in a general server, a processing device CPU, a memory MEM, an input device IN, an output device OUT, and a bus (not illustrated) that connects each unit are provided. A program executed by the learning data generation system 1500 is assumed to be stored in the memory MEM in advance.

In the present embodiment, functions such as calculation and control are implemented by the processing device CPU executing the program stored in the memory MEM in cooperation with other hardware. The program executed by the processing device CPU, the function, or a means for implementing the function may be referred to as a "function", a "means", a "unit", a "module", or the like.

In the present embodiment, the memory MEM stores a learning data generator 1501 and a machine learning unit 1502 as software for executing processing described later. The memory MEM can be configured by, for example, a semiconductor storage device.

The learning data generation system 1500 can access a storage device 1510 and use data stored in the storage device 1510. In addition, the learning data generation system 1500 can record data in the storage device 1510. The storage device 1510 can be configured by, for example, a magnetic storage device or the like.

In the present embodiment, the database DB1 of a first field and the database DB2 of a second field are assumed to be stored in the storage device 1510 in advance. The database DB1 of the first field is, for example, a database of the disease field, and the database DB1 of the second field is, for example, a database of the pharmaceutical field (see FIGS. 9A to 9C). In this example, the number of databases is two, but the number is arbitrary.

In the present embodiment, filter data FT is assumed to be stored in advance in the storage device 1510. A specific example of the filter data FT is the integrated filter 100U illustrated in FIG. 6, for example. A plurality of types of integrated filters 100U having different characteristics are assumed to be stored in the filter data FT in advance.

The learning data generator 1501 generates a big table TB and learning data TD from the database DB1 of the first field and the database DB2 of the second field, and records the big table TB and the learning data TD in the storage device 1510. A specific example of the big table TB is the big table 1000 (see FIG. 10). In the embodiment, the data stored in the storage device 1510 is described in a data structure in a table format, but may be expressed in a data structure such as a list or a queue.

On the basis of the big table TB, the objective variable and the explanatory variable are aggregated for each personal ID in accordance with, for example, the conditions of the logical formula illustrated in FIG. 8. Then, for example, it is possible to obtain learning data indicating what kind of disease a person having a disease of acute myocardial infarction or myocardial infarction and prescribed Buscopan tablet 10 mg or Gabalon tablet 5 mg suffers from or what kind of drug the person is prescribed. Since information of a large number of people is included in the existing database, learning data of a large number of people can be obtained in a similar manner.

The machine learning unit 1502 performs machine learning by using the obtained learning data TD. In the embodiment, the learning data generation system 1500 includes the machine learning unit 1502, but may have a completely independent and separate configuration. By providing the learning data TD and having learning performed by an arbitrary method, the effect of the present embodiment can be obtained. Since a machine learning method itself may be a known method, details of the machine learning method will be omitted.

In the description of the embodiment, there is a case where the description is given by using a "program" as a subject. However, since the program is executed by the processing device CPU to perform determined processing while using the memory MEM, the input device IN, and the output device OUT, the description may be given by using the processing device CPU as a subject. The processing disclosed with the program as a subject may be processing performed by the learning data generation system 1500. A part or all of the program may be implemented by dedicated hardware.

Examples of the input device IN include a keyboard and a pointer device, but other known devices may be used. Examples of the output device OUT include a display and a printer, but other known devices may be used. The input device IN and the output device OUT may include an interface that communicates with another external device.

The above configuration may be configured by a single computer, or any part of the processing device CPU, the memory MEM, the input device IN, and the output device OUT may be configured by another computer connected via a network. The storage device 1510 may be a part of the learning data generation system 1500 or may be connected to a system separate from the learning data generation system 1500 via a network.

In the present embodiment, a function equivalent to a function configured by software can also be implemented by hardware such as a field programmable gate array (FPGA) and an application specific integrated circuit (ASIC).

Figure 16A:
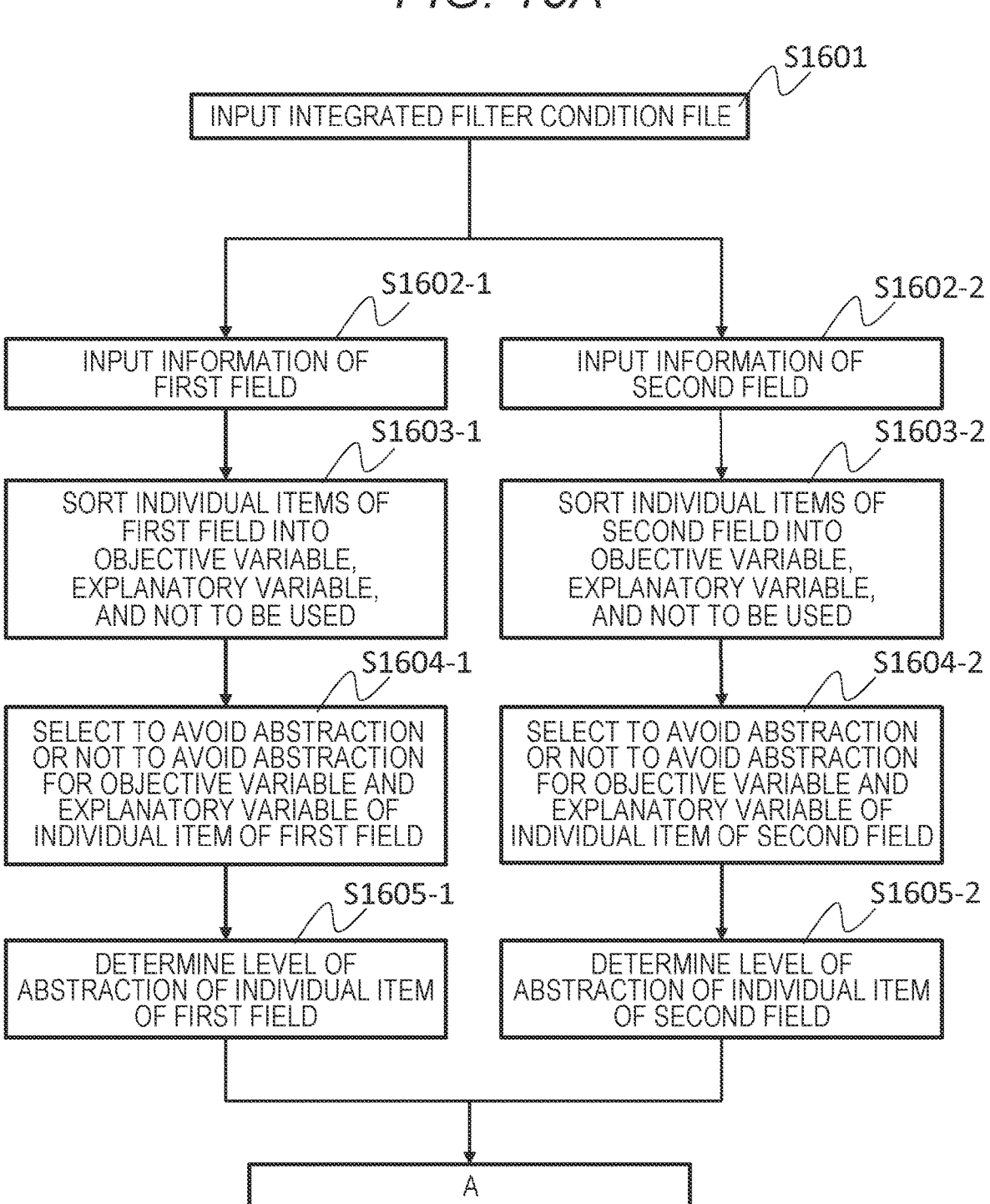
FIG. 16A is a processing flowchart of the learning data generation system.

FIG. 16A is a flowchart illustrating a flow of learning data generation processing executed by the learning data generator 1501.

The learning data generator 1501 accesses the filter data FT in the storage device 1510, reads a file of one or a plurality of integrated filters 100U designated by the user, and acquires a filter condition (S1601).

Hereinafter, one integrated filter that integrates two databases will be described as an example. As described above, the number of databases to be integrated is arbitrary depending on the specifications of the integrated filter. In addition, when a plurality of integrated filters are read, similar processing to processing described below may be repeated by the number of filters.

The learning data generator 1501 accesses the database DB1 of the first field of the storage device 1510 and acquires data (S1602-1). In this example, data is assumed to be hierarchized into the large category, the middle category, the small category, and individual items (see FIG. 2).

The learning data generator 1501 sorts the individual items of the acquired data into individual items, explanatory variables, and not to be used in accordance with the filter condition (see FIG. 6) (S1603-1).

The learning data generator 1501 selects to avoid abstraction or not to avoid abstraction for the objective variable and the explanatory variable of the individual item of the first field in accordance with the filter condition (see FIG. 6) (S1604-1).

The learning data generator 1501 determines the level of abstraction of the individual item of the first field in accordance with the filter condition (see FIG. 6) (S1605-1). In this example, there are four types of level of abstraction including the large category, the middle category, the small category, and no abstraction.

The above processing enables abstraction of the individual items of the database of the first field by designating a range. Note that, in the above example, abstraction is performed after the individual items are sorted into the variables, but the individual items may be sorted into the variables after abstraction. In addition, the level of degree of abstraction is determined at the end, but may be determined first. That is, the order of the flow is not limited to the example in FIG. 16.

The learning data generator 1501 accesses the database DB2 of the second field of the storage device 1510 and performs the processing of S1602-2 to S1605-2 in a similar manner to the above. The same applies to a case where the number of databases to be integrated is three or more.

As a result of the processing illustrated in FIG. 16A, for example, as illustrated in the big table 1000 in FIG. 10, variables of the first field and variables of the second field, which are abstracted by designating a range and divided into an objective variable and an explanatory variable, are obtained.

Figure 16B:
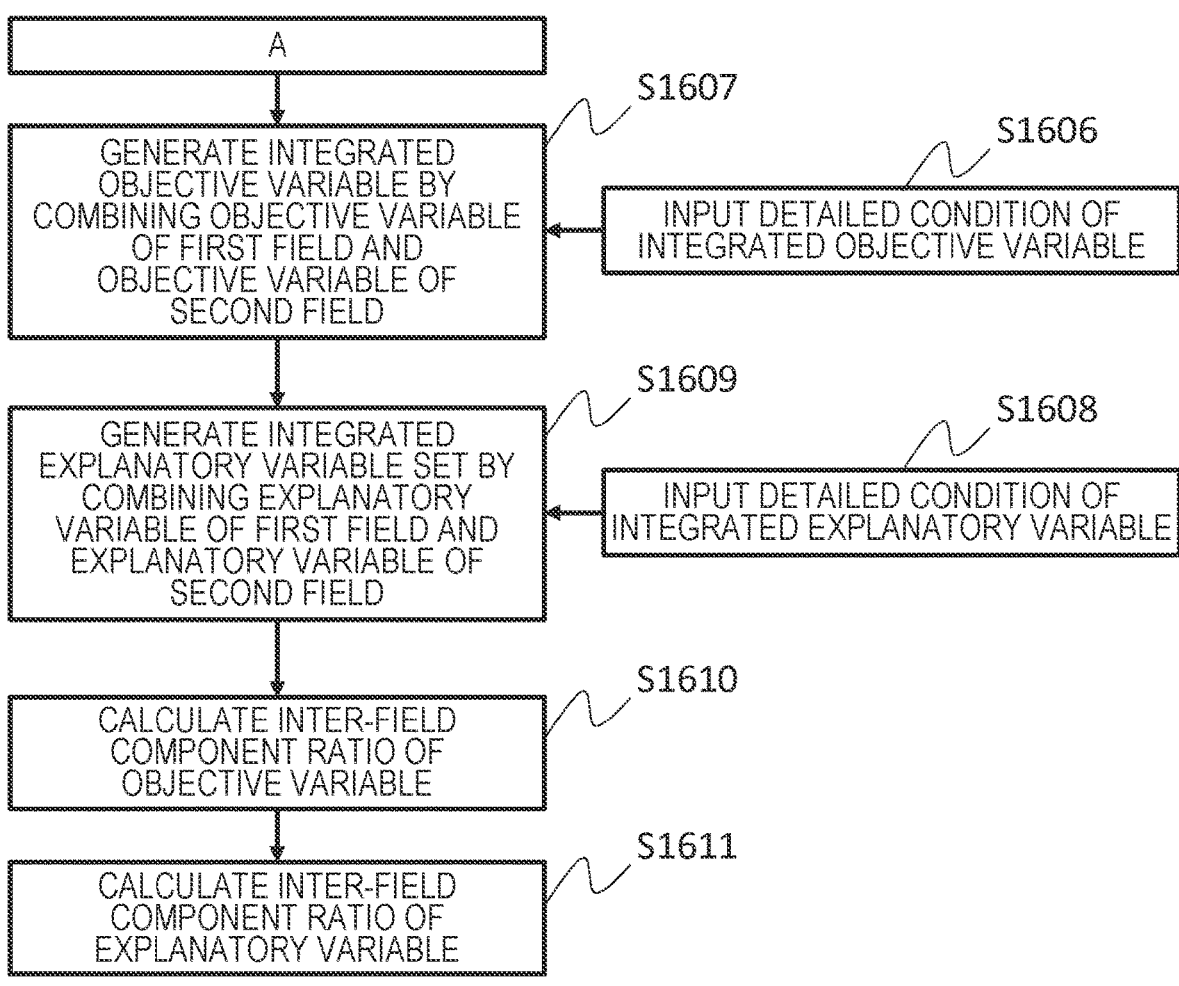
FIG. 16B is a processing flowchart of the learning data generation system (continued from above)

FIG. 16B is a flowchart continued from FIG. 16A, illustrating a flow of the learning data generation processing executed by the learning data generator 1501.

The learning data generator 1501 obtains the detailed condition of the integrated objective variable from the file of the integrated filter 100U obtained in S1601 (S1606). This is generally obtained in a form of logical formula such as AND, OR, NOT, NOR, and the like.

The learning data generator 1501 generates an integrated objective variable by combining the objective variable of the first field and the objective variable of the second field on the basis of the obtained logical formula (S1607).

The learning data generator 1501 obtains the detailed condition of the integrated explanatory variable from the file of the integrated filter 100U obtained in S1601 (S1608). This is generally obtained in a form of logical formula such as AND, OR, NOT, NOR, and the like.

The learning data generator 1501 generates an integrated explanatory variable set by combining the explanatory variable of the first field and the explanatory variable of the second field on the basis of the obtained logical formula (S1609).

The learning data generator 1501 calculates an inter-field component ratio of the integrated objective variable (S1610). This is easily obtained from the integrated data model 200U.

The learning data generator 1501 calculates an inter-field component ratio of the integrated explanatory variable (S1611). This is easily obtained from the integrated data model 200U.

The processing regarding one integrated filter condition ends here. Data including the integrated objective variable and the integrated explanatory variable set can be used as the learning data.

Sixth Embodiment

In a sixth embodiment, an example will be described in which automatic tuning of parameters of an integrated filter is performed with the fifth embodiment as a basic configuration to generate learning data, and a machine learning model is trained with the learning data to generate a prediction model.

FIG. 17 is a flowchart illustrating an example of the automatic tuning of parameters of the integrated filter executed by the learning data generator 1501.

The learning data generator 1501 sets an ideal value of the inter-field component ratio of the objective variable and the explanatory variable (S1701).

Specifically, the learning data generator 1501 displays a GUI illustrated in FIG. 14 on a display device (specific example of the output device OUT in FIG. 15), causes the user to operate a scale of the region 1401, and causes the user to input an inter-field component ratio of the objective variable and the explanatory variable ideal for the user.

The learning data generator 1501 sets N integrated filter condition files (S1702). As the N integrated filter condition files, the learning data generator 1501 reads desired files from the filter data FT in the storage device 1510. The N integrated filter condition files may be selected by the user or may be automatically selected by a predetermined rule.

The learning data generator 1501 calculates the inter-field component ratio of the objective variable and the explanatory variable for each of N integrated filter conditions in a similar manner to the processing of S1610 and S1611 in FIG. 16B (S1703).

The learning data generator 1501 selects an integrated filter condition in which the inter-field component ratio of the objective variable and the explanatory variable is close to the ideal value set in the processing of S1701 (S1704).

The learning data generator 1501 configures a big table in accordance with the selected integrated filter condition (S1705). Specifically, each item of the big table 1000 in FIG. 10 is determined.

The learning data generator 1501 inputs a numerical value to the big table 1000 for each component in one data file. This processing is performed for all the files of the database (S1706).

In the above-described manner, for example, the big table 1000 in FIG. 10 can be obtained. A detailed condition (for example, see FIG. 8) of the data model is further applied to the big table, and the corresponding data is used as learning data. As described above, this data is illustrative data indicating what kind of explanatory variable a person has when the person has (or does not have) a predetermined objective variable. Therefore, a relationship between the objective variable and the explanatory variable can be learned by using the learning data of the machine learning model.

Although the configuration is not illustrated, the generation of the prediction model by machine learning (S1707) can be performed by the machine learning unit 1502 by using known hardware and software.

The above embodiment can achieve efficient machine learning, thus reduce energy consumption, reduce carbon emissions, prevent global warming, and contribute to realization of a sustainable society.

What is claimed is:

1. A method of configuring a data model for learning data for machine learning, the method comprising:

preparing filter data, the filter data specifying a degree of abstraction or a degree of detail to be designated for each of the data items and sorting the data items into an objective variable and an explanatory variable;

configuring, by an information processing device, a data model in which the data item to be the objective variable and the data item to be the explanatory variable are defined to extract a data item to be used for training data from a database using at least one filter that acts on the data items based on the filter data, enables specification of the degree of abstraction or the degree of detail of the data items, and allocates data items to the objective variable and the explanatory variable;

training a machine learning model using the objective variable and the explanatory variable;

wherein a plurality of databases are used as a basis of the learning data and data items of each of the plurality of databases have the hierarchical structure of the degree of abstraction or the degree of detail, wherein the at least one filter is applied to each of the plurality of databases and functions as an integrated filter that extracts the data items to be used for the learning data from the plurality of databases and integrates the data items;

wherein the at least one filter applied to each of the plurality of databases has a different characteristic, and wherein the method further comprises calculating a ratio of the objective variable and the explanatory variable extracted by the integrated filter from each of the plurality of databases.

2. The method of configuring a data model for learning data according to claim 1, wherein in a case where the data items have a hierarchical structure of categories and individual items, the at least one filter has functions of a first filter, a second filter, and a third filter, wherein the first filter determines whether each of the individual items is an objective variable, an explanatory variable, or not to be used, wherein the second filter determines an abstraction of each of the individual items, and wherein the third filter determines whether to avoid abstraction of each of the individual items.

3. The method of configuring a data model for learning data according to claim 1, wherein in a case where the data items have a hierarchical structure of categories and individual items, the at least one filter has functions of a first filter, a second filter, and a third filter, wherein the first filter determines whether each of the categories is an objective variable, an explanatory variable, or not to be used, wherein the second filter determines a detailing of each of the categories, and wherein the third filter determines whether to avoid the detailing of each of the categories.

4. The method of configuring a data model for learning data according to claim 1, the method further comprising:

preparing a plurality of candidates for the integrated filter;

calculating, by each of the plurality of candidates of the integrated filter, the ratio of the objective variable and the explanatory variable extracted from each of the plurality of databases; and selecting the integrated filter that achieves the ratio of the objective variable and the explanatory variable closest to an input value.

5. A learning data generation apparatus that generates learning data for machine learning, the learning data generation apparatus comprising:

a processor configured to execute a learning data generator, and a machine learning unit, wherein the learning data generator is configured to:

prepare filter data, the filter data specifying a degree of abstraction or a degree of detail, the degree of abstraction or the degree of detail of the data items to be designated for each of the data items and sorting the data items into an objective variable and an explanatory variable, and configure, by an information processing device, a data model in which the data item to be the objective variable and the data item to be the explanatory variable are defined to extract a data item to be used for training data from a database using at least one filter that acts on the data items based on the filter data, enables specification of the degree of abstraction or the degree of detail of the data items for each data item, and allocates data items to the objective variable and the explanatory variable, wherein the machine learning unit is configured to train a machine learning model using the objective variable and the explanatory variable;

wherein a plurality of databases are used as a basis of the learning data and the data item of each of the plurality of databases have a hierarchical structure of the degree of abstraction or the degree of detail, wherein the at least one filter is applied to each of the plurality of databases and functions as an integrated filter that extracts data to be used for the learning data from the plurality of databases and integrates the data, wherein the at least one filter applied to each of the plurality of databases has a different characteristic; and wherein the filter further determines whether the data item of each of the plurality of databases is not to be used.

6. The learning data generation apparatus according to claim 5 wherein the at least one filter has a function of generating an integrated objective variable and an integrated explanatory variable by performing a logical operation on at least one of the objective variable and the explanatory variable extracted from the plurality of databases.

7. The learning data generation apparatus according to claim 5, wherein the learning data generator has a function of selecting a ratio of the objective variable and the explanatory variable extracted from each of the plurality of databases.

8. The learning data generation apparatus according to claim 5, wherein a plurality of types of the integrated filters calculate the ratio of the objective variable and the explanatory variable extracted from each of the plurality of databases, and wherein the learning data generator selects the integrated filter that achieves the ratio of the objective variable and the explanatory variable closest to an input value.

* * * * *